United States Patent
Schaller

(10) Patent No.: US 7,473,358 B1
(45) Date of Patent: Jan. 6, 2009

(54) HINGED COVER FOR USE IN A CLARIFIER TANK HAVING AN INBOARD LAUNDER CHANNEL

(75) Inventor: Earle Schaller, 4362 N. Lake Blvd., Palm Beach Gardens, FL (US) 33410

(73) Assignee: Earle Schaller, Palm Beach Gardens, FL (US)

( * ) Notice: Subject to any disclaimer, the term of this patent is extended or adjusted under 35 U.S.C. 154(b) by 0 days.

(21) Appl. No.: 11/824,545

(22) Filed: Jun. 29, 2007

(51) Int. Cl.
*B01D 21/24* (2006.01)

(52) U.S. Cl. .................... 210/232; 210/528; 210/540; 210/541

(58) Field of Classification Search ............ 210/188, 210/232, 513, 521, 525, 528, 529, 539, 540, 210/541, 542; 220/565, 600, 660
See application file for complete search history.

(56) References Cited

U.S. PATENT DOCUMENTS

| | | | | |
|---|---|---|---|---|
| 4,391,704 A | * | 7/1983 | Anderson | 210/188 |
| 4,767,536 A | * | 8/1988 | Roley | 210/539 |
| 5,252,205 A | * | 10/1993 | Schaller | 210/232 |
| 5,597,483 A | * | 1/1997 | Schaller | 210/541 |
| 5,670,045 A | * | 9/1997 | Schaller | 210/540 |
| 5,965,023 A | * | 10/1999 | Schaller | 210/540 |
| 6,216,881 B1 | | 4/2001 | Schaller | 210/540 |
| 6,712,222 B2 | * | 3/2004 | Schaller | 210/540 |
| 2007/0138087 A1 | * | 6/2007 | Aditham et al. | 210/540 |

* cited by examiner

*Primary Examiner*—Christopher Upton
(74) *Attorney, Agent, or Firm*—Sofer & Haroun, LLP

(57) ABSTRACT

A cover arrangement for an inboard launder channel includes at least one cover panel positioned over the inboard launder channel, having a first attachment portion and a second attachment portion. A first cover support bracket is coupled to a first upper side wall of the inboard launder channel and a second cover support bracket is coupled to a second upper side wall of the inboard launder channel. The first attachment portion is coupled at a first end to the first cover support bracket and at a second upper end is angled, inward towards the center of the inboard launder channel. The second attachment portion is coupled at a first end to the second cover support bracket and at a second upper end is angled, inward towards the center of the inboard launder channel. This allows a user to open the cover panel upward and away from one of the side walls of the inboard launder channel so as to clean the inside of the channel.

10 Claims, 4 Drawing Sheets

(PRIOR ART)

HINGED COVER FOR USE IN A CLARIFIER TANK HAVING AN INBOARD LAUNDER CHANNEL

FIELD OF THE INVENTION

The present invention relates generally to the cleaning of sewage treatment facilities and more particularly, to a cover system which inhibits the growth of algae on the surfaces of an inboard launder channel of sedimentation water treatment tanks employed in such facilities as well as a cover system that effects the capture of noxious gases in an inboard launder configuration.

BACKGROUND OF THE INVENTION

The necessity for providing sewage treatment plants to clean and purify water discharged from homes and factories is well known. The function of a sewage treatment facility is to receive raw sewage (water containing waste material) as discharged from a city sewage system and clean it to ultimately produce purified water. This is accomplished through a series of biological and mechanical processes.

In a typical water treatment facility, the raw sewage is received from the sewage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank forming sludge. This sludge is removed for "digestion" by microorganisms. The digested sludge is then dried and can be used as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. This notwithstanding, most final sedimentation water treatment tanks are circular. This simplifies automatic skimming, churning and/or bottom scraping operations. More specifically, by eliminating inaccessible corners and providing uniform surfaces, a revolving scraper arm or skimmer blade can provide complete and efficient churning and prevent sludge buildup. Water treatment tanks with non-circular configurations are not as common but are also used.

During operation of one type of circular water treatment tank having an inboard launder channel arrangement, water containing sediment enters the tank from influents located in both the central region of the circular tank and the outer perimeter region of the tank. If the launder channel, explained more fully in the next paragraph, does not prevent the water flow between the central region and the outer perimeter region of the tank, then the sediment-containing water can enter the tank from a single influent located anywhere in the tank. In a continuous process, the lighter clean water is effectively decanted from the heavier sediment containing water. More particularly, the clean water is displaced from the tank by the constant flow of sediment-containing water into the tank. The displaced clean water is forced to flow into an inboard launder channel which is disposed about the center of the tank.

The inboard launder channel is configured such that the inner perimeter of the launder channel is located a specified distance radially away from the center of the tank and the outer perimeter of the launder channel is located a greater specified distance away from the center of the tank, but is not contiguous with the outer perimeter of the tank. The resulting configuration permits sediment-containing water entering the tank to displace cleaner water which is forced to flow under the baffle plate and over the weir located at the inner perimeter of the launder channel. The configuration further permits sediment-containing water entering the tank to displace cleaner water which is forced to flow under a baffle plate and over a weir located at the outer perimeter of the launder channel. This system is commonly referred to as an inboard launder channel configuration.

In the circular tank configuration, the baffle plate and weir, the functions of which will be explained more fully later, are circular in shape when seen in the plan view. As explained previously, they are typically located at the inner and outer perimeters of the launder channel. The displaced clean water ultimately enters the launder channel which directs the water to the next treatment stage where it is chlorinated and further made safe to be discharged into a river or stream.

Presently, algae growth in the launder channel is a serious problem in clarifier tanks. Specifically, as algae builds up on the surfaces of the clarifier tank, particularly on the weirs, it can substantially interfere with the hydraulic flow therethrough. Algae typically adhere to the wet surfaces of the weir and the channel, where it becomes unsightly and odorous. When the launder channel is cleaned, however, the algae are often loosened and cause clogging of the downstream filters.

For many years, the removing of algae from the baffle, weir, spillway and clean water flow channel has been completed primarily by scrubbing the tank structure with brushes manipulated by hand. Because the final treatment tanks are quite large, this is a labor-intensive and tedious process, involving a large expenditure of man-hours. Additionally, the algae removing process must be done frequently, thereby further adding to the cost. The additional time and cost of manually cleaning the baffle, weir and spillway is compounded by the inboard launder configuration, since the inboard launder configuration typically utilizes two scum baffles, weirs and spillways, as opposed to a single baffle, weir and spillway in a conventional configuration. This arrangement results in roughly twice the surface area which needs to be kept free of or cleaned of algae build-up. Furthermore, since the inboard launder channel is centrally located in the tank, rather than along the tank's outer perimeter, it is difficult for a worker to manually reach the baffles, weirs and spillways in order to clean them by hand, forcing additional expenditure of resources to insure the safety for the workers employed for the task.

More recent proposals directed at the problem of algae growth have utilized mechanical brushes to automate the cleaning process. One such device is disclosed in U.S. Pat. No. 4,830,748. While this apparatus is somewhat effective in cleaning the baffle, weir, spillway and clean water flow channel of a circular tank, it is somewhat limited in application in that it is adapted to be mounted to a revolving skimmer blade. Accordingly, it can only be effectively utilized with circular water treatment tanks, wherein the launder channel is disposed about the outer perimeter of the tank, incorporating such a blade. The cost of obtaining, installing, and maintaining such an automated system, though perhaps preferable to the alternative of periodic manual scrubbing, is also quite high. An inboard launder configuration is even less suitable for this type of mechanical brush operation, since the inner and outer baffles, weirs and spillways would require, in the circular tank configuration, two mechanical brush systems— one which brushed the inner baffle, weir and spillway from the center of the tank, and a second which rotated around the outer perimeter of the tank in order to reach the baffle, weir and spillway located at the outer perimeter of the launder channel.

Other waste water facilities have utilized chlorine and other chemicals in sufficient concentrations to kill the algae. However, a large number of waste water facilities utilize a denitrification process that precludes the use of such chemical additives. As such, a need is recognized for a proactive system that inhibits the growth of algae in the inboard launder channel of a clarifier tank.

Yet another approach for preventing algae growth is the use of a hinged cover system such as that found in U.S. Pat. No. 6,216,881. As shown in FIG. 1, the '881 patent discloses a cover system which is positionable over an inboard launder channel of a clarifier tank in order to prevent sunlight from reaching the surfaces of the inboard launder channel. By blocking the sunlight, the cover system inhibits the growth of algae on the surfaces of the launder channel and obviates the need for frequent scrubbing or complex automated cleaning devices.

However, such a cover arrangement maintains several drawbacks. For example, a first drawback with the prior art cover for the inboard launder channel is that the cover attaches directly at the tops of the inside and outside launder channel wall support brackets. Due to the proximity of such connection points and the water level in the tank, the area may become soiled hampering clean activities. Furthermore, the hinge mechanism being directly attached to the top edge of the support makes latch mechanism difficult to install. Additionally, the strain on this connection point due to repeated openings may cause the brackets to loosen and the cover system to be damaged.

OBJECTS AND SUMMARY

It is therefore an object of the present invention to overcome the drawbacks associated with the prior art and to provide an improved hinged cover for an inboard launder channel for a clarifier tank that employs an improved design for the cover support brackets as well as an improved securing mechanism for locking the cover to the support brackets.

To this end, the present invention provides for a cover arrangement for an inboard launder channel. The cover arrangement includes at least one cover panel positioned over the inboard launder channel having a first attachment portion and a second attachment portion.

A first cover support bracket is coupled to a first upper side wall of the inboard launder channel, configured to support the first attachment portion of the cover panel; and a second cover support bracket coupled to a second upper side wall of the inboard launder channel, configured to support the second attachment portion of the cover panel.

The first attachment portion is coupled at a first end to the first cover support bracket and at a second upper end is angled, inward towards the center of the inboard launder channel, such that the second angled end is in a mating relationship with the cover panel. The second attachment portion is coupled at a first end to the second cover support bracket and at a second upper end is angled, inward towards the center of the inboard launder channel, such that the second angled end is also in a mating relationship with the cover portion. This allows a user to open the cover panel upward and away from one of the side walls of the inboard launder channel so as to clean the inside of the channel.

BRIEF DESCRIPTION OF THE DRAWINGS

In the drawings, wherein like reference numbers denote similar elements throughout the several views.

DETAILED DESCRIPTION OF THE INVENTION

Figure 1:
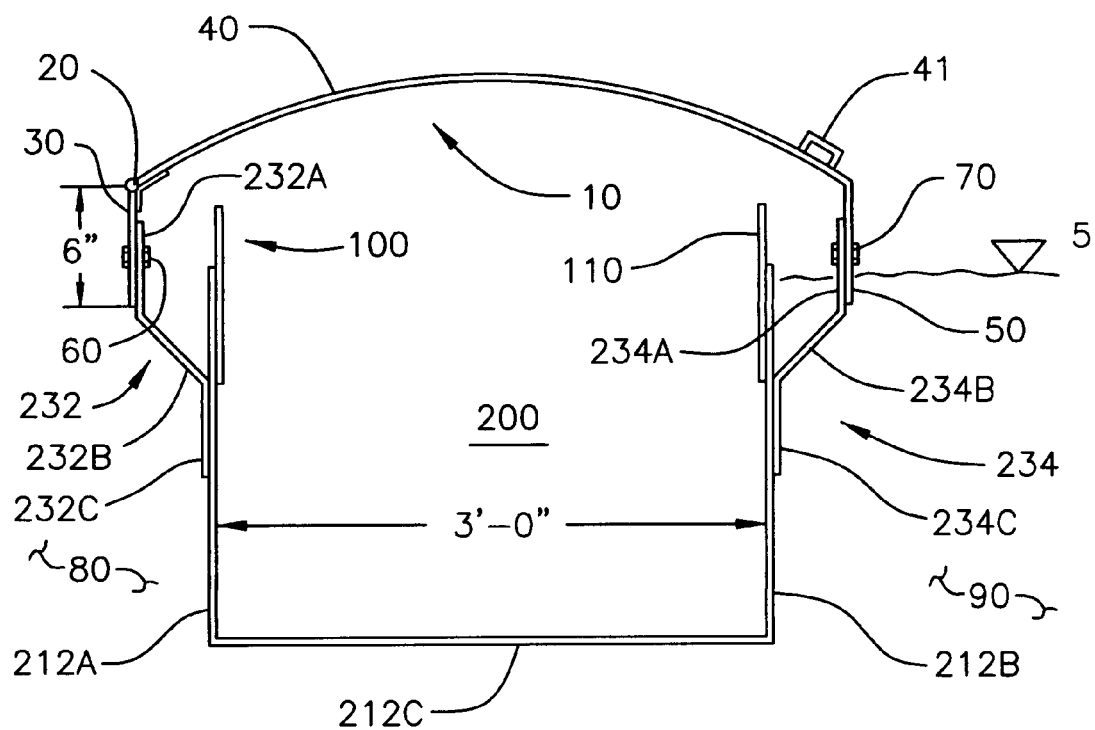
FIG. 1 is a prior art hinged cover for an inboard launder channel.
Figure 2:
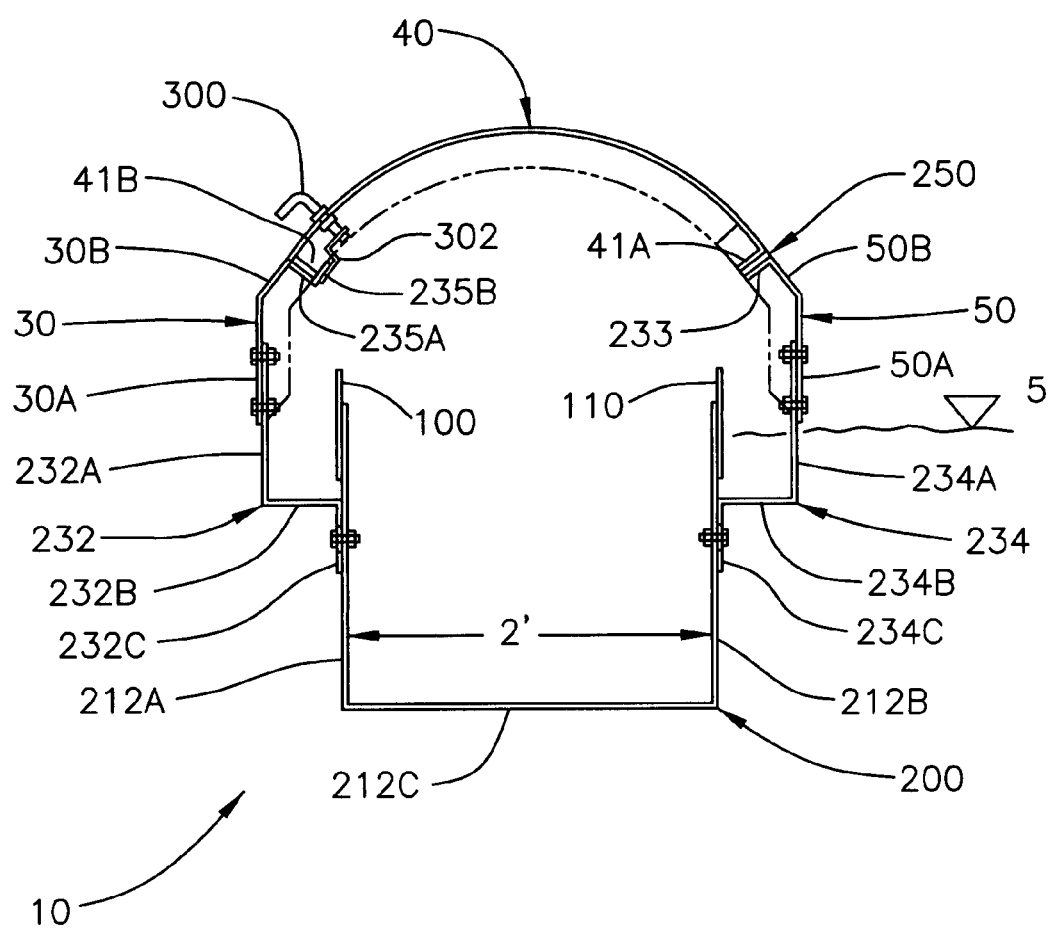
FIG. 2 is a side view of a hinged cover for a launder channel in accordance with one embodiment of the present invention.
Figure 3:
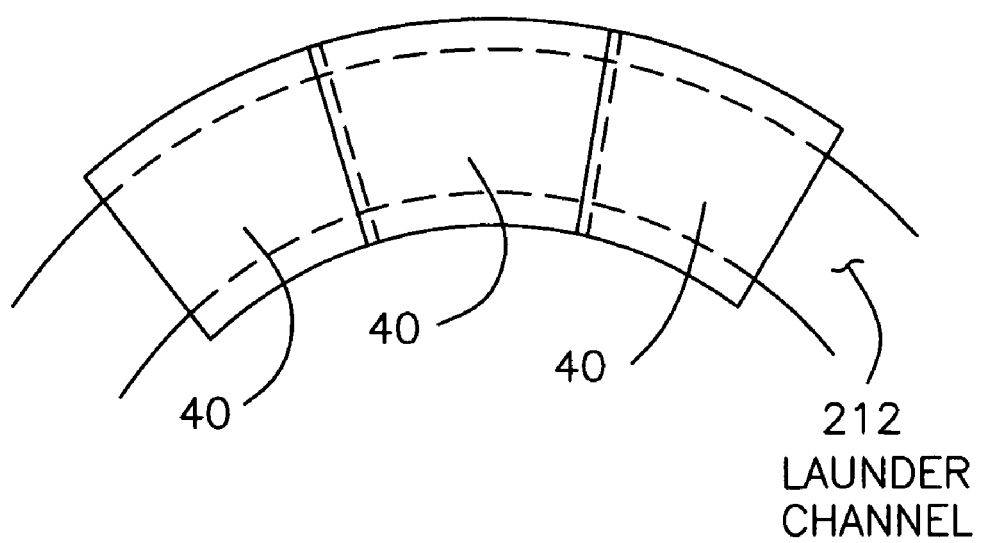
FIG. 3 is a plan view of a plurality of hinged cover portions from FIG. 2 for a circular inboard launder channel, in accordance with one embodiment of the present invention.

Reference is now made to FIG. 2 showing the cover system 10 of the present invention installed over the clean water flow or launder channel 200 of a clarifier or final sedimentation water treatment tank 12. In the embodiment depicted in FIG. 2, only one of the panel members of system 10 is shown. In accordance with the present invention, numerous panel members can be utilized and secured to launder channel 200. When installed in the position shown in FIG. 2, the panel members are dimensioned to completely cover launder channel 200. For example, FIG. 3 shows in plan view several cover sections 22 disposed around launder channel 200.

As discussed previously, a principal object of the present invention is to prevent the growth of algae on the interior surfaces of launder channel 200. To this end, each cover panel member 40 comprises an opaque material which reflects and/or absorbs substantially all light incident thereon. In this regard, it will be readily appreciated that a wide variety of rigid or flexible materials may be utilized for the construction of the panel members. The panel members may, for example, be formed from metal or alloys thereof, fiberglass, or from substantially opaque thermosetting or thermoplastic materials. It is also possible, of course, to make the panel member opaque by applying a suitable coating, such as a light reflective or absorptive coating, to the exterior and/or interior surfaces thereof. In so doing, it is possible to utilize even transparent or translucent plastic materials to fabricate the panel members of the present invention.

In a currently preferred implementation, the individual covers are fabricated from a molded reinforced fiberglass composite. Each molded cover 10 incorporates a cover panel member 40, and, advantageously, a first side 30 and a second side 50 to facilitate securing the panel member to the clarifier tank. It is noted that although first side 30 and second side 50 are described as subsections of panel 40, they may be, as illustrated in FIG. 2, be separately formed elements for coupling to cover support brackets 232 and 234 as described below.

Most preferably, the thickness of the fiberglass panels is in the range of about 3/16 to 3/4 of an inch, a range that provides substantial structural strength and rigidity while remaining sufficiently light weight for ease of installation.

Each panel member can also be provided with a network of cross braces or other strengthening members (not shown) to enhance the rigidity to each panel member and provide a walkway surface capable of supporting one or more maintenance workers. Typically, such cross braces or other strengthening members can be fabricated out of a lightweight material such as balsa wood which can then be sandwiched between two or more layers of fiberglass. If desired, the upper surface of each panel member may be provided with a roughened, non-skid texture to prevent injury to such workers. As shown in FIG. 3, cover panel member 40 may be arcuate so as not to allow rain and snow to accumulate and puddle thereon.

As shown in FIG. 2, launder channel 200 is defined by first and second sidewalls 212a and 212b, and channel bottom 212c. As illustrated, sidewall 212a is the inner sidewall, as it is radially closer to the center of tank 12 and thus, is adjacent to first side (interior edge surface) 30 of cover panel member 40. Conversely, sidewall 212b is the outer sidewall, as it is radially farther from the center of tank 12 and thus, is adjacent to second side (exterior edge surface) 50 of cover panel member 40. Suitably fastened to first and second sidewalls 212a and 212b, by any conventional mechanical fastening means, are corresponding first and second weirs 100 and 110, respectively. Weirs 100 and 110 are typically V-notched at spaced intervals, to permit water flow therethrough.

As will be readily appreciated by those skilled in the art, a variety of fastening devices and techniques may be used to secure cover panel members 40 in position over launder channel 200. In the embodiment shown in FIG. 2, cover support brackets 232 and 234 are upwardly extending from sidewalls 212a and 212b and fasten to interior edge surface 30 and exterior edge surface 50, respectively. In the embodiment shown, cover support bracket 232 comprises three sections: a substantially vertical section 232a which fastens to interior edge surface 30, a vertical section 232c which fastens to sidewall 212a, and a substantially horizontal section 232b for connecting section 232a to 232c. In a similar fashion, cover support bracket 234 comprises three sections: a substantially vertical section 234a which fastens to exterior edge surface 50, a vertical section 234c which fastens to sidewall 212b, and a substantially horizontal section 234b for connecting section 234a to 234c.

In one embodiment of the present invention, as illustrated in FIG. 2, second side exterior edge surface 50 maintains a lower substantially vertical portion 50a and an inwardly angled upper portion 50b. At the end of inwardly angled upper portion 50b, a downward flange 233 is disposed with hinge 250 located at the connection of flange 233 to angled upper portion 50b. Also coupled to hinge 250 is an inwardly down turned flange 41a of cover panel member 40 that corresponds substantially to downward flange 233. Such a connection point provides an advantage over the prior art in that downward flange 233 of second side exterior edge portion 50 and flange 41a of cover panel member 40 at the exterior section of cover arrangement 10 prevents water from the tank from interfering with the proper functioning of hinge 250 by deflecting away splashing water, preventing corrosion and scum buildup that could hamper cleaning efforts.

In another embodiment of the present invention as illustrated in FIG. 2, first side interior edge surface 30 maintains a lower substantially vertical portion 30a and an inwardly angled upper portion 30b. At the end of inwardly angled upper portion 30b, a downward flange 235a extends inward towards the surface of launder channel 200 an terminates in a perpendicular resting lip 235b running substantially parallel to cover panel 40.

An inwardly down turned flange 41b of cover panel member 40 corresponds substantially to downward flange 235a and resting lip 235b. Like the connection on the inside of launder channel 200, this connection point on the exterior side of launder channel 200 near exterior launder channel wall 212b provides an advantage over the prior art in that downward flange 235a and resting lip 235b protect cover panel 40 and its down turned flange 41b from water and scum splashing over weir 100 into channel 200. Such an arrangement, by deflecting away splashing water, prevents corrosion and scum buildup that interferes with the opening of panel 40 and reduces the necessary cleaning of panel 40 and channel 200 during routine washings.

Figure 4:
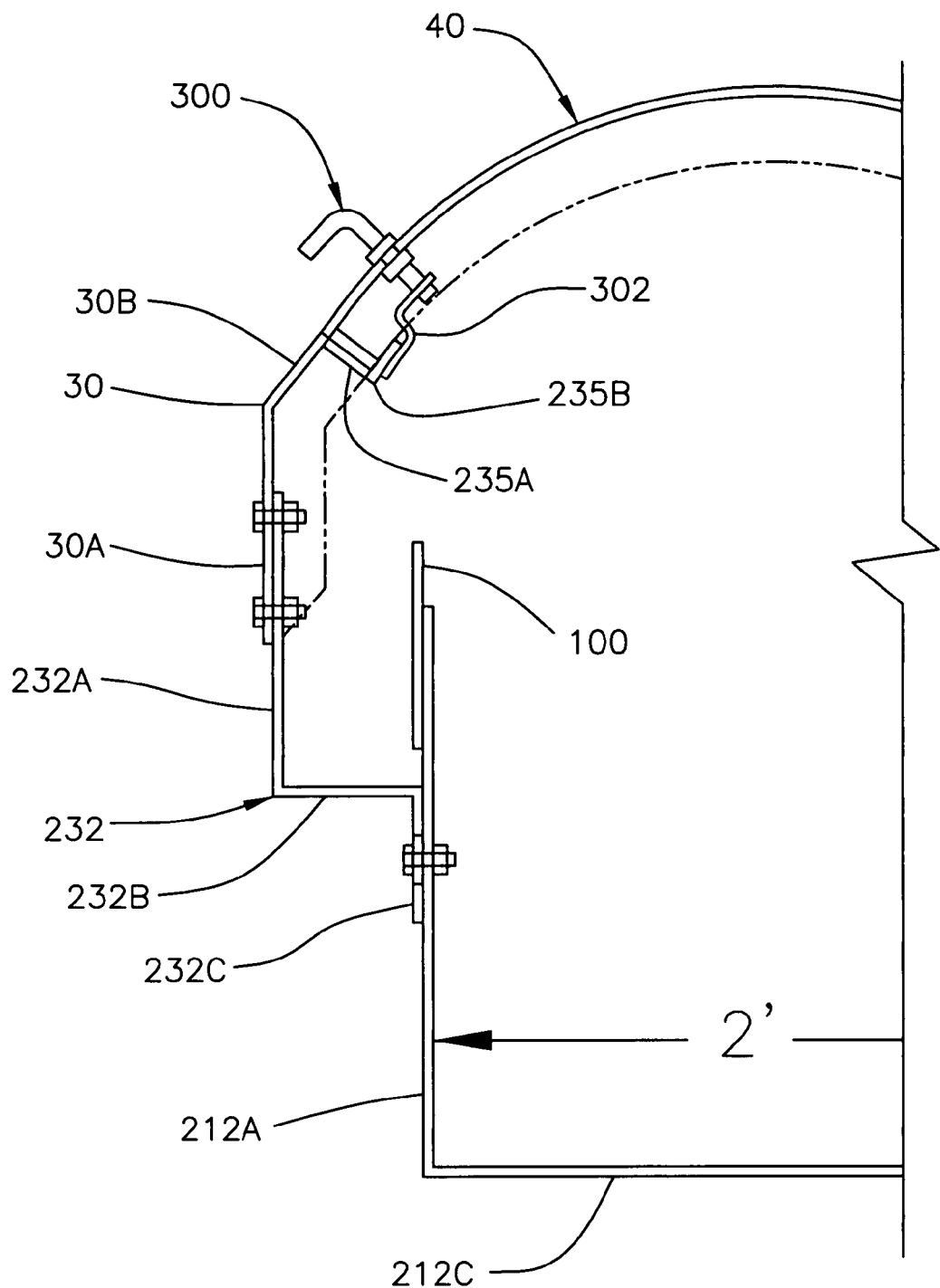
FIG. 4 is a close up view of a swing hinge, and resting lip from the hinged cover as shown in FIG. 2 in accordance with one embodiment of the present invention.

In another embodiment of the present invention, as shown in FIGS. 2 and 4 a swing handle 300 is shown extending out of the top of the exterior side of cover panel 40 near first side 30. Swing handle 300 extends through cover panel 300 and maintains a latch 302. When in a locked position, latch 302 is positioned under resting lip 235b of first side 30 locking cover panel 40 in a closed position. Alternatively, when a user rotates swing handle 300 approximately 90 degrees, coupled latch 302 is removed from under resting lip 235b releasing cover panel 40 for opening against hinge 250 for cleaning of weirs 100 and 110, and channel 200. Such an arrangement with the added coupling of latch 302 to resting lip 235b further prevents the build up of scum and dirt near the opening portion of panel 40 at its connection point with first side interior edge 30.

It is noted that the above description of the present invention illustrates cover panel 40 opening such that hinge is toward the center of the tank and the opening portion is towards the outer wall. However, it is understood that in another embodiment of the present invention, the arrangement may be reversed having the cover open up towards the outer tank wall from the center in an installation.

It can be appreciated that a plurality of cover support brackets 232 and 234, and a plurality of first and second sides 30 and 50 of cover panel 40, as described above, can be disposed around inner and outer sidewalls 212a and 212b of launder channel 200 at various intervals as desired. The number, size and strength of a plurality of support brackets 232 and 234 and sides 30 and 50 are determined by conventional mechanical strength analysis and will depend on the weight of the cover panel as constructed and whether the cover panels will be walked on by workers, thereby subjecting the brackets to increased weight loads. Regardless of the number, size and strength of the brackets chosen, however, the brackets should be narrow enough and located at adequate radially-spaced intervals to avoid substantial interference with the hydraulic flow therethrough.

In one embodiment of the present invention, hinge 250 used by cover system 10 to pivotally mount exterior edge surface 50 to cover panel member 40 is dependent upon the configuration of the cover system. For instance, in the configuration of cover panels shown in FIG. 2, a continuous hinge, extending from one lateral side of a particular cover panel member 40 to the other lateral side of the same cover panel member 40, can be utilized.

With reference to FIG. 2, it will be seen that the panel members 40 of cover system 10 may be dimensioned and contoured to achieve a contiguous relationship with the interior surfaces of the launder channel and with each other. In the illustrative embodiment of the present invention, launder channel 200 of primary tank 12 has a sidewall configuration which is circular in the plan view (see FIG. 3). As seen in FIG. 3, each panel member 40 defines an interior and an exterior edge surface having a radius of curvature corresponding to the radius of curvature of first and second sidewalls 212a and 212b of launder channel 200.

In addition to the principal object of preventing the growth of algae on the interior surfaces of the launder channel, spillway and weir, a further object of the present invention is to control the odor that may emanate from clarifier tank 12. It is recognized that a large percentage of the noxious gases generated in a settling tank are released as the clarified water spills over weirs 100 and 110. Accordingly, by capturing these hazardous gases in the launder channel region and drawing them off to a scrubber system or other gas processing apparatus (not shown) or to otherwise dispose of the gases, one is able to reduce the discharges of gases into the atmosphere to an acceptably safe level.

As shown in FIG. 2, when interior edge surface 30 and exterior edge surface 50 extend below water level 5, they act to seal launder channel 200 from the atmosphere. Pipes or ducts may be coupled to the sealed cover system 10 so that a fan or pump (not shown) in operation may draw off the noxious gases to a scrubber system. In this way, noxious gases emitted into launder channel 200 are prevented from being discharged into the atmosphere.

It would be understood that the preferred embodiments and examples described are for illustrative purposes only and are not to be construed as limiting the scope of the present invention which is properly delineated only in the appended claims.

The invention claimed is:

1. A cover arrangement for an inboard launder channel, said cover arrangement comprising:
   at least one cover panel positioned over the inboard launder channel, said cover panel having a first attachment portion and a second attachment portion;
   a first cover support bracket coupled to a first upper side wall of said inboard launder channel, configured to support said first attachment portion of said cover panel; and
   a second cover support bracket coupled to a second upper side wall of said inboard launder channel, configured to support said second attachment portion of said cover panel, wherein
   said first attachment portion is coupled at a first end to said first cover support bracket and at a second upper end is angled, inward towards the center of said inboard launder channel, such that said second angled end is in a mating relationship with said cover panel, and wherein said second attachment portion is coupled at a first end to said second cover support bracket and at a second upper end is angled, inward towards the center of said inboard launder channel, such that said second angled end is also in a mating relationship with said cover portion, said configuration allowing a user to open said cover panel upward and away from one of said side walls of said inboard launder channel so as to clean the inside of said channel.

2. The cover arrangement as claimed in claim 1, wherein one of said attachment portions is hinged at its mating relationship with said cover panel, and the other of said attachment portions is openable at its mating relationship with said cover panel.

3. The cover arrangement as claimed in claim 2, wherein said first attachment portion is located towards the outer wall of a tank which contains said launder channel and said second attachment portion is located towards the center of said tank.

4. The cover arrangement as claimed in claim 3, wherein said upper angled end of said first interior attachment portion of said cover maintains a perpendicularly disposed downward flange, and subsequently perpendicular resting lip, configured to support the cover panel.

5. The cover arrangement as claimed in claim 4, wherein said cover further maintains a swivel handle near first vertical side wall for locking cover panel down.

6. The cover arrangement as claimed in claim 5, wherein said swivel handle has a latch that catches under resting lip for locking said cover panel over said launder channel, and away from resting lip for un-locking said cover.

7. The cover arrangement as claimed in claim 2, wherein said first attachment portion is located towards the center of a tank which contains said launder channel and said second attachment portion is located towards the outer wall of said tank.

8. The cover arrangement as claimed in claim 2, wherein said first and second support brackets have a first lower vertical portion attached to the sidewall, an upper vertical portion attached to the attachment portions of said cover panel and a third horizontal portion therebetween such that the attachment portions of said cover panel are supported outwardly and away from said first and second side walls of said launder channel.

9. The cover arrangement as claimed in claim 8, wherein said first and second side walls of said launder channel further include weirs for preventing solids from entering said launder channel.

10. The cover arrangement as claimed in claim 9, wherein said cover panel covers said weirs from said first and second side walls of said launder channel.

* * * * *